(12) United States Patent
Brown et al.

(10) Patent No.: US 6,582,799 B1
(45) Date of Patent: Jun. 24, 2003

(54) LAMINATED TRANSPARENCY

(75) Inventors: C. Edward Brown, Altoona, PA (US); William S. Cunningham, Springdale, PA (US); Michael T. Fecik, Pittsburgh, PA (US); Vaughn R. Imler, Tyrone, PA (US); Alana R. Zajdel, Lower Burrell, PA (US); William B. Zimmerman, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/512,852

(22) Filed: Feb. 25, 2000

Related U.S. Application Data
(60) Provisional application No. 60/137,095, filed on Jun. 2, 1999.

(51) Int. Cl.$^7$ ................................................. B32B 17/10
(52) U.S. Cl. ........................ 428/174; 428/34; 428/187; 428/437; 428/911; 296/84.1; 296/190.1; 362/503
(58) Field of Search .......................... 428/34, 174, 187, 428/437, 911; 296/84.1, 190.1; 362/503

(56) References Cited

U.S. PATENT DOCUMENTS

| | | | | |
|---|---|---|---|---|
| 3,234,062 A | * | 2/1966 | Morris | 156/104 |
| 3,406,086 A | * | 10/1968 | Foster | 156/103 |
| 3,459,526 A | | 8/1969 | Stickel et al. | 65/289 |
| 3,476,540 A | | 11/1969 | Ritter, Jr. et al. | 65/107 |
| 3,505,160 A | * | 4/1970 | Michaels et al. | 156/104 |
| 3,527,589 A | | 9/1970 | Ritter, Jr. | 65/289 |
| 3,904,460 A | | 9/1975 | Comperatore | 156/102 |
| 4,197,108 A | | 4/1980 | Frank et al. | 65/273 |
| 4,265,650 A | | 5/1981 | Reese et al. | 65/104 |
| 4,272,274 A | | 6/1981 | Frank et al. | 65/273 |
| 4,508,556 A | | 4/1985 | Bennett et al. | 65/25.4 |

(List continued on next page.)

FOREIGN PATENT DOCUMENTS

| | | |
|---|---|---|
| DE | 89 10 916.3 | 12/1989 |
| EP | 0 108 616 | 5/1984 |
| EP | 0 394 089 | 10/1990 |
| EP | 0 451 608 | 10/1991 |
| EP | 0 600 766 | 6/1994 |
| GB | 2 190 877 | 12/1987 |
| WO | 98/50228 | 11/1998 |
| WO | 98/58885 | 12/1998 |

OTHER PUBLICATIONS

Atkins, P.W., General Chemistry, W.H. Freeman and Company, 1990, p. 389.*
Lewis, Richard J, Condensed Chemical Dictionary, John Wiley & Sons, Inc., 1997, pp. 371 and 609.*

*Primary Examiner*—Harold Pyon
*Assistant Examiner*—Alicia Chevalier
(74) *Attorney, Agent, or Firm*—Andrew C. Siminerio

(57) ABSTRACT

A laminated article is provided which is particularly well adapted for use as an automotive sidelite. The laminated article includes a first ply, a second ply and an interlayer located between the two plies, with the two plies and interlayer dimensioned such that the laminated article has a total thickness of about 4.0–6.0 mm, more preferably of about 4.0–5.0 mm. The plies are preferably heat strengthened glass in the thickness range of about 1.0–3.0 mm. The interlayer is preferably a plastic material, such as polyvinyl butyral, and has a thickness in the range of about 0.50–0.80 mm. A coating, such as a solar control coating or electroconductive coating, can be formed or deposited on one or more surfaces of the plies and/or interlayers. A method and apparatus are also provided for producing a laminated sidelite of the invention.

5 Claims, 2 Drawing Sheets

U.S. PATENT DOCUMENTS

| | | | |
|---|---|---|---|
| 4,579,577 A | 4/1986 | Claassen | 65/273 |
| 4,610,771 A | 9/1986 | Gillery | 204/192.1 |
| 4,661,139 A | 4/1987 | Reese et al. | 65/106 |
| 4,716,086 A | 12/1987 | Gillery et al. | 428/630 |
| 4,746,347 A | 5/1988 | Sensi | 65/94 |
| 4,792,536 A | 12/1988 | Pecoraro et al. | 501/70 |
| 4,806,220 A | 2/1989 | Finley | 204/192.27 |
| 4,820,902 A | 4/1989 | Gillery | 219/203 |
| 4,830,650 A | 5/1989 | Kelly | 65/106 |
| 4,834,857 A | 5/1989 | Gillery | 204/192.27 |
| 4,898,789 A | 2/1990 | Finley | 428/623 |
| 4,898,790 A | 2/1990 | Finley | 428/623 |
| 4,902,580 A | 2/1990 | Gillery | 428/623 |
| 4,948,677 A | 8/1990 | Gillery | 428/623 |
| 5,028,759 A | 7/1991 | Finley | 219/203 |
| 5,059,295 A | 10/1991 | Finley | 204/192.27 |
| 5,099,105 A | 3/1992 | Goerenz et al. | 219/203 |
| 5,147,485 A * | 9/1992 | Gajewski et al. | 156/104 |
| 5,198,304 A | 3/1993 | Krämling et al. | 428/437 |
| 5,240,886 A | 8/1993 | Gulotta et al. | 501/70 |
| 5,286,271 A | 2/1994 | Rueter et al. | 65/106 |
| 5,385,872 A | 1/1995 | Gulotta et al. | 501/71 |
| 5,393,593 A | 2/1995 | Gulotta et al. | 428/220 |
| 5,653,903 A | 8/1997 | Pinchok, Jr. et al. | 219/203 |
| 5,821,001 A | 10/1998 | Arbab et al. | 428/623 |

* cited by examiner

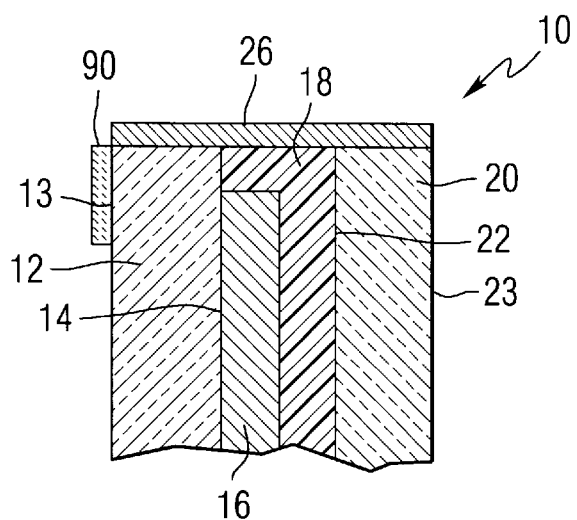
FIG. 1
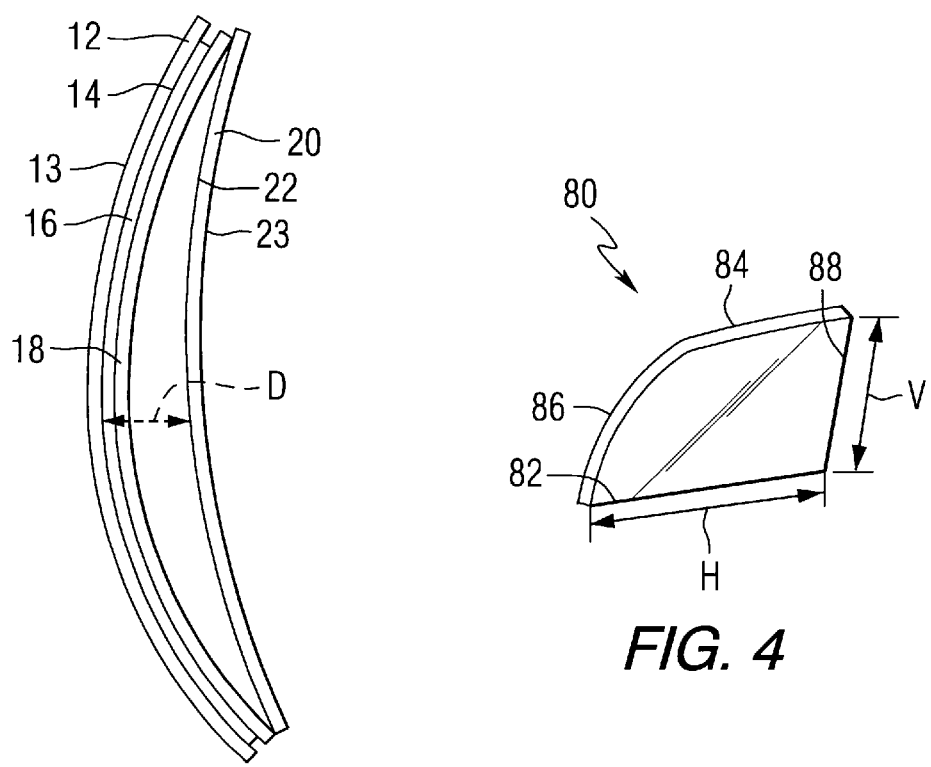
FIG. 2
FIG. 4

LAMINATED TRANSPARENCY

CROSS-REFERENCE TO RELATED APPLICATION

This application claims the benefits of U.S. Provisional Application No. 60/137,095 filed Jun. 2, 1999 and entitled "Laminated Transparency", which is herein incorporated by reference.

BACKGROUND OF THE INVENTION

1. Field of the Invention

This invention relates generally to the manufacture of laminated transparencies, e.g. laminated automotive transparencies, and, more particularly, to shaped, laminated automotive sidelites and to methods of making the sidelites.

2. Description of the Currently Available Technology

Typically, automotive windshields include two 1/8" (3.2 mm), shaped annealed glass plies secured together by a 0.030" (0.76 mm) polyvinyl butyral interlayer. Examples of automotive windshields and methods of making the same are disclosed in U.S. Pat. Nos. 4,820,902; 5,028,759; and 5,653,903, which are herein incorporated by reference.

As can be appreciated by those skilled in the art, the processes of making laminated windshields are not easily adapted to making other types of laminated automotive transparencies, such as sidelites. For example, the glass blanks used in the manufacture of laminated windshields are typically annealed glass. On the other hand, glass blanks used in the manufacture of sidelites are typically tempered glass. Tempered sidelites are preferred to prevent damage to the sidelites during normal operation, e.g. door slamming, rolling the sidelites up and down, etc. The processing parameters and methods of treating annealed glass may not necessarily be translated directly for use with tempered glass.

Further, windshields are generally made from two glass plies, each 1/8" (3.2 mm) thick. The commercial production and shaping of glass sheets for windshields usually includes positioning one flat sheet on top of another flat sheet, heating the two stacked flat glass sheets in a furnace to the softening point of the glass, simultaneously shaping the heated glass sheets to a desired curvature and then cooling the bent glass sheets in a controlled manner to anneal the sheets. Conventional sidelites, on the other hand, are usually made from a single flat glass sheet or blank having a thickness in the range of 4 to 5 mm. The flat glass sheet is heated, shaped and tempered. The heating, bending and shaping of thinner glass blanks is more difficult than for thicker glass blanks. Thinner glass blanks pose problems in shaping and tempering due to the lesser ability of thinner glass blanks to retain heat. More particularly, as the thickness of the glass blank decreases, the rate of heat loss increases, and the heat initially imparted to the glass blank is quickly dissipated upon leaving the heating atmosphere of the furnace.

Generally, in the process of making sidelites, flat glass is shaped to defined curvatures or contours dictated by the shape and outline of the frames defining the window openings and window channels into which the sidelite is to be installed. By convention, most commercial vehicles have window channels configured for use with sidelites having a total thickness of about 4–5 mm. Therefore, in order to be integrated into an existing window channel without requiring extensive reengineering and also to be able to be retrofitted into existing vehicles, a laminated sidelite should preferably be of about the same thickness.

EP 0 600 766 discloses a laminated panel having a body with at least three layers of silicate glass and at least two intermediate layers of thermoplastic, with a total thickness of 6.0–9.0 mm. The panel has a thinner, stepped edge which can be inserted into a fixed side window guide, but the panel cannot be rolled up or down as a conventional vehicle sidelite due to the thickness of the panel body.

U.S. Pat. No. 5,198,304 discloses a laminated sidelite having different amounts of tempering in viewing and marginal areas to avoid tempering process deformations. This requires cooling different portions of the heated glass at different rates.

Another drawback in making laminated sidelites not encountered when making windshields is the problem associated with heating glass sheets having a functional coating, such as a solar control coating. Making laminated sidelites, rear windows and/or sunroofs having such a coating only on one blank is more difficult than making coated laminated windshields. More particularly, in the manufacture of windshields one surface of a flat blank is coated and a second flat blank, usually uncoated, is positioned, i.e. superimposed, over the first coated blank. The overlying blanks are heated, shaped and annealed simultaneously. In the manufacture of laminated, coated sidelites, rear windows and/or sun roofs, a coated flat blank and an uncoated flat blank are separately heated, shaped and heat treated. Because one blank is coated and the other uncoated, the shapes of the heat-treated coated and uncoated blanks do not match and are not compatible for lamination.

As can be appreciated by those skilled in the art of making automotive sidelites, it would be advantageous to provide a laminated automotive transparency, e.g., a sidelite, and a method of making the same that reduce or eliminate the problems discussed above.

SUMMARY OF THE INVENTION

This invention relates to a laminated article, e.g., an automotive sidelite, including a first ply secured to a second ply by a sheet of interlayer material. The first ply has a concave surface with a predetermined concave shape and the second ply has a convex surface with a predetermined convex shape. The concave surface may have a smaller radius of curvature than the convex surface. The laminated sidelite has a total thickness of about 3.0 mm to about 6.0 mm, preferably of about 4.0 mm to about 5.0 mm. Each ply is a heat treated, e.g., tempered or heat strengthened (at least partially tempered) glass ply having a thickness of less than about 3.0 mm, preferably about 1.0 mm to about 3.0 mm, and more preferably about 1.6 mm to about 2.1 mm. The interlayer material is preferably a plastic material, such as polyvinyl butyral or the like, and has a thickness of less than about 0.80 mm, preferably between about 0.50 mm to about 0.80 mm. A functional coating, such as but not limited to a solar control coating, a low emissivity coating having at least one dielectric layer and at least one infrared reflective layer, an electroconductive coating, a heatable coating, or an antenna coating can be incorporated into the laminated article, e.g., by providing a coating on the first ply concave surface by depositing or forming the coating.

This invention further relates to a method for producing the laminated article of the invention, e.g., an automotive sidelite. The method includes providing first and second blanks and then preferably using different techniques and parameters to heat, shape and heat treat the blanks to form first and second plies having predetermined concave and convex surfaces, respectively. The first blank has a functional coating provided over at least a portion of a major surface thereof. The coated first blank is heated by supplying heat principally or primarily, if not totally, toward the uncoated side of the first blank. The heating temperature is controlled by sensing the temperature substantially adjacent the uncoated side of the first blank, e.g., adjacent a furnace conveyor supporting the first blank. The second, uncoated blank is heated by supplying heat toward both sides of the second blank. Heating the second blank is controlled by sensing the temperature on both sides of the second blank, e.g. by sensing and controlling the temperature of heaters located above and below the furnace conveyor and preferably sensing the temperature below the second blank and adjacent the conveyor supporting the second blank and controlling both the top and bottom heaters. The first and second blanks may be shaped, e.g. by different shaping surfaces, such that the concave surface has a smaller radius of curvature than the convex surface. However, the predetermined concave and convex surfaces are substantially similar for the laminated surfaces to substantially match when the first and second plies are laminated together about an interlayer.

BRIEF DESCRIPTION OF THE DRAWINGS

FIG. 1 is a side, sectional view (not to scale) of an edge portion of a laminated automotive transparency, e.g., a sidelite, incorporating features of the invention.

FIG. 2 is a side, schematic view (not to scale) of assembled components of a sidelite of the invention prior to lamination.

FIG. 4 is a perspective view of a glass blank used in the practice of the invention for forming a laminated sidelite incorporating features of the invention.

DESCRIPTION OF THE PREFERRED EMBODIMENTS

Figure 3:
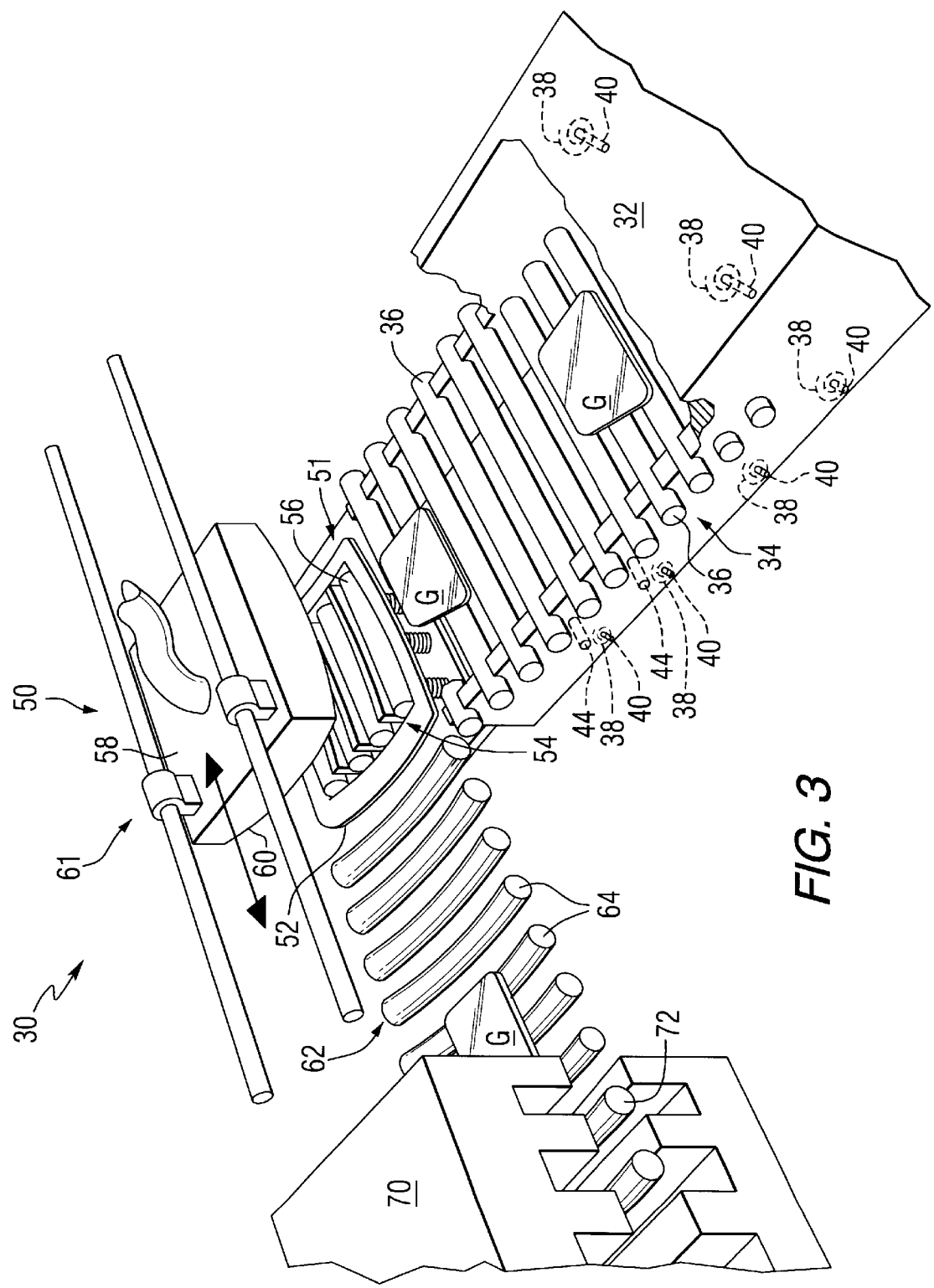
FIG. 3 is a perspective, partially broken view of a preferred embodiment of an apparatus (with portions removed for clarity) for producing glass blanks G (coated or uncoated) in the practice of the invention.

FIG. 1 illustrates a laminated article 10, incorporating features of the invention. In the following discussion, the laminated article is an automotive sidelite; however, as will be appreciated by those skilled in the art, the laminated article is not limited to automotive sidelites but may be a residential and/or commercial laminated window, and/or a transparency for land, air, space, above water and underwater vehicles, e.g. a windshield sidelite, backlite, sun or moon roof to name a few articles. As will be described in more detail, the laminated sidelite 10 includes a first blank or ply 12 having an outer major surface 13 and an inner major surface 14, optionally a functional coating 16 applied to at least a portion of the inner major surface 14, an interlayer 18 and a second blank or ply 20 having an inner major surface 22 and an outer major surface 23. Usually the outer major surface 13 faces the exterior of the vehicle, and the outer major surface 23 faces the interior of the vehicle. An edge sealant 26 can be applied to the perimeter of the laminated sidelite 10 during and/or after lamination. A decorative band 90, e.g., an opaque, translucent or colored band, such as a ceramic band, may be provided on a surface of at least one of the plies 12 and 20, for example around the perimeter of the inner major surface 14 and/or 23. The functional coating 16 can be applied to, e.g., deposited on or formed on, the inner major surface 14 in any convenient manner, for example as described below.

The first ply 12 and the second ply 20 are each preferably made of a transparent or translucent material, such as plastic, ceramic or, more preferably, heat treated or heat strengthened glass. As used herein, the term "heat strengthened" means tempered or at least partially tempered. The first ply 12 and second ply 20 can each be "clear" float glass or can be tinted or colored glass or one ply can be clear glass and the other colored glass. Although not limiting to the invention, examples of glass suitable for the first ply 12 and/or second ply 20 are described in U.S. Pat. Nos. 4,746,347; 4,792,536; 5,240,886; 5,385,872; and 5,393,593, which are herein incorporated by reference. The first and second plies are each preferably less than about 3.0 mm thick, more preferably less than about 2.1 mm thick and even more preferably in the thickness range of about 1.6 mm to about 2.1 mm.

The functional coating 16 may be of any desired type. The functional coating 16 is preferably a coating which affects the solar control properties, e.g., emissivity, shading coefficient, transmission, absorption, reflection, etc., or conductive properties, e.g., thermal or electrical conduction, of the coated ply. For example, but not to be considered as limiting, the functional coating 16 can be an electroconductive coating, a heatable coating, an antenna coating, or a solar coating, such as a low emissivity coating having at least one dielectric layer and at least one infrared reflective layer, such as silver, just to name a few.

As used herein, the term "solar control coating" refers to a coating comprised of one or more layers or films which affect the solar properties of the coated article, such as but not limited to the amount of solar radiation incident on and/or passing through the coated article, infrared or ultraviolet absorption or reflection, shading coefficient, emissivity, etc. The solar control coating may block, absorb or filter selected portions of the solar spectrum, such as but not limited to the visible spectrum. Non-limiting examples of solar control and antenna coatings are disclosed in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,759 and in U.S. patent application Ser. No. 09/058,440, which patents and patent application are herein incorporated by reference. Non-limiting examples of electroconductive coatings are disclosed in U.S. Pat. Nos. 5,653,903 and 5,028,759, which are herein incorporated by reference.

Although not limiting to the invention, the functional coating 16 is preferably provided on the inner major surface 14 to make the coating less susceptible to environmental and mechanical wear than if on an outer surface of the laminate. However the functional coating 16 could also be provided on one or more of the surfaces 13, 22 or 23. Further and not limiting to the invention, as shown in FIG. 1 a portion of the coating 16, e.g., about a 1–6 mm, preferably 2–4 mm, wide area around the outer perimeter of the coated region, can be removed or deleted in any conventional manner, e.g., by grinding prior to lamination or masking during coating to minimize damage to the coating at the edge of the laminate by weathering or environmental action during use. For aesthetic purposes, a colored, opaque or translucent band 90 may be provided over one or more surfaces of the plies, e.g., around the perimeter of the outer major surface 13, to hide the deleted portion. The band 90 is preferably made of a ceramic material and is fired onto the outer major surface 13 in any conventional manner.

The interlayer 18 is preferably a plastic material, such as polyvinyl butyral or a similar material, having a thickness of between about 0.50 mm to about 0.80 mm, preferably less than about 0.76 mm. The interlayer 18 secures the plies 12 and 20 together, provides energy absorption, reduces sound attenuation into the interior of the vehicle to decrease road noise and increase the strength of the laminated structure, making it more difficult for thieves to gain access to the interior of the vehicle by breaking one of the vehicle sidelites. The interlayer 18 may be a sound absorbing or attenuating material as described, for example, in U.S. Pat. No. 5,796,055, which is herein incorporated by reference. Moreover, although not preferred, the interlayer 18 may have a solar control coating provided thereon or incorporated therein or may include a colored material to reduce solar energy transmission.

As shown schematically in FIG. 2, the inner major surface 22 of the second ply 20 is substantially complementary to the inner major surface 14 of the first ply 12. More particularly, the inner surface 14 of the first ply 12 has a predetermined concave contour defined as a predetermined concave shape, and the inner major surface 22 of the second ply 20 has a predetermined convex contour defined as a predetermined convex shape. The predetermined concave shape and the predetermined convex shape are similar if not identical for adhering the plies to the interlayer. In the practice of the invention and as shown in FIG. 2 and discussed in more detail below, the surface 22 may have slightly less curvature, i.e., can be "flatter", than the surface 14 so that the two glass plies 12 and 20 are separated by a distance D at or near the centers of the two plies 12 and 20 when the plies 12 and 20 are initially positioned for lamination. However, the distance D, if present at all, should preferably be 0–1 mm, and preferably less than about 0.5 mm. While the two plies 12 and 20 are preferably about the same dimensions, i.e., thickness, width and length, it is to be understood that one ply could be larger, e.g., wider and/or longer, than the other ply so that when the plies 12 and 20 are laminated, a portion of one ply extends beyond the peripheral edge of the other ply.

A sidelite incorporating features of the invention was made using two plies of 2.1 mm thick flat glass of the type sold by PPG Industries, Inc. under its trademark SOLEX®. One glass ply had a magnetic sputter vapor deposition (MSVD) heat treatable low emissivity coating having one silver layer. The other glass ply had no coating. The interlayer had a thickness of 0.75 mm.

A preferred method of making a sidelite 10 in accordance with the teachings of the invention will now be discussed. A first substrate and second substrate are provided. The first substrate is preferably a piece of flat glass having a thickness of about 1.0 mm to about 3.0 mm, preferably about 1.6 mm to about 2.1 mm.

A functional coating is applied to at least a portion of a major surface of the first glass substrate in any conventional manner. As discussed above, the functional coating can be, for example, a low emissivity or solar control coating and can be applied to or deposited over at least a portion of the major surface by any convenient method, such as but not limited to MSVD, chemical vapor deposition (CVD), spray pyrolysis, sol-gel, etc. As used herein, the terms "deposited over" or "provided over" mean deposited or provided above but not necessarily adjacent to. In a currently preferred embodiment of the invention, the functional coating was a heat treatable MSVD low emissivity coating having a single film of silver and sold by PPG Industries, Inc. of Pittsburgh, Pa., under the registered trademark SUNGATE®.

As can be appreciated, the coating can be applied to the flat substrate or to the substrate after bending and shaping. Applying the functional coating prior to bending and shaping the substrate is preferred because it provides significant advantages.

The second substrate is preferably a piece of flat glass similar to the first substrate but preferably without a functional coating. The coated first substrate and uncoated second substrate are cut to provide a first, coated blank and a second, uncoated blank each having a desired shape. As presently preferred, the overall shapes of the two blanks, i.e., length, width, etc., are substantially identical. The coated and uncoated blanks are seamed, washed, bent and shaped to a desired contour to form first and second plies 12 and 20, respectively, to be laminated. As can be appreciated by one of ordinary skill in the art, the overall shapes of the coated and uncoated blanks and plies depend upon the particular vehicle into which they will be incorporated, since the final shape of a sidelite differs between different automotive manufacturers.

The coated and uncoated blanks can be shaped using the "RPR" process disclosed in U.S. Pat. No. 5,286,271, which disclosure is herein incorporated by reference. Using the RPR process, the coated and uncoated glass blanks, each advanced separately on a conveyor, are heated in a furnace to a temperature sufficient to soften the blank but not adversely impact or burn the coating. The coated and uncoated heated blanks are bent, shaped and controllably cooled to form the curved, heat strengthened first and second plies 12 and 20. A band, e.g., about 2–4 mm wide, of the functional coating 16 can be removed from around the peripheral edge of the coated blank before, during or after heating and shaping in any convenient manner, e.g., by grinding, prior to lamination. Alternatively, the peripheral edge of the first substrate can be masked prior to coating to form an uncoated border or band around the peripheral edge of the coated blank.

Although the conventional RPR process could be used to form the glass plies 12 and 20, in the currently preferred practice of the invention, a modified RPR process is preferred. A modified RPR apparatus and process in accordance with the invention will now be described. With particular reference to FIG. 3, a modified RPR apparatus 30 of the invention includes a furnace 32, e.g., a radiant heat furnace, having a furnace conveyor 34 comprised of a plurality of spaced furnace conveyor rolls 36. Heaters, such as radiant heater coils 38, are positioned above and below the furnace conveyor 34 along the length of the furnace 32. Heater or coil temperature sensors 40 are positioned adjacent the heater coils 38, e.g. inside each coil, and are connected to a furnace control device (not shown) to control the temperature of the heater coils 38 to a desired set point. In the practice of the invention and as described in more detail below, conveyor or roll temperature sensors 44 are positioned adjacent, e.g., below, the furnace rolls 36, preferably between the furnace conveyor 34 and the bottom heaters, and are also connected to the furnace control device. The temperature of the top and bottom coils 38 along the furnace 32 can be controlled to form heating zones of different temperature along the length of the furnace 32.

A shaping station 50 is located adjacent the discharge end of the furnace 32. The shaping station 50 is substantially the same as that described in U.S. Pat. No. 5,286,271 and includes a lower mold 51 which can include a vertically movable flexible ring 52 and a shaping station conveyor 54 having a plurality of rolls 56. An upper vacuum mold 58 comprising a removable or reconfigurable shaping surface 60 of a predetermined shape is located above the lower mold 51. The vacuum mold 58 is movable via a shuttling arrangement 61.

A transfer station 62 having a plurality of shaped transfer rolls 64 is located adjacent a discharge end of the shaping station 50. The transfer rolls 64 preferably have a transverse elevational curvature corresponding substantially to the transverse curvature of the shaping surface 60.

A tempering or cooling station 70 is located adjacent a discharge end of the transfer station 62 and includes a plurality of rolls 72 to move the blanks through the station 70 for cooling, tempering and/or heat strengthening. The rolls 72 have a transverse elevational curvature substantially the same as that of the transfer rolls 64.

To heat the coated blank for shaping, it is recommended that the RPR heating process be modified to eliminate picture framing, e.g., curl of the edges of the shaped coated blank which results in optical distortion after lamination. For example, in the currently preferred practice of the invention, the uncoated glass blank is heated in the furnace 32 with the radiant heating coils 38 located both above and below the furnace rolls 36 being energized and the coil temperatures controlled using the coil temperature sensors 40. The top coils 38, i.e. those located above the furnace conveyor 34, provide most of the heat and the bottom coils 38, i.e. those located below the furnace conveyor 34, provide sufficient heat to prevent the glass from curling. The heat sensors 40 located in the heating coils 38 provide temperature data to the control device and the coil power is controlled based on the heat sensor data. For uncoated glass blanks of about 1.6 mm to about 2.1 mm thickness, the coil temperatures are controlled to provide a temperature of about 700° F. (371° C.) to about 1100° F. (590° C.), preferably about 850° F. (454° C.), at the entrance end of the furnace and about 1150° F. (621° C.) to about 1400° F. (770° C.), preferably about 1250° F. (677° C.), at the exit end of the furnace, with a target glass exit temperature of about 1140° F. (615° C.) to about 1180° F. (638° C.), preferably about 1160° F. (627° C.). The furnace roll speed is about 20 feet per minute (6 meters/min) to about 30 feet per minute (9 meters/minute), preferably about 27.5 ft/min (8.4 m/min). The total heating time for the uncoated glass blank is preferably about 2.5 mins to about 3.0 mins.

In the practice of the invention, the heating process is modified to heat the coated, e.g. low emissivity coated, glass blank to eliminate picture framing. More particularly, the top heating coils 38 are not energized or are energized only to a small extent, e.g. sufficient to prevent curling of the blank. Heat is primarily, if not solely, supplied by the bottom heating coils 38 located below the rolls 36. Further, at least the bottom temperature sensors 40, preferably both the top and bottom temperature sensors 40, are preferably turned off. The temperature of the lower coils 38 is controlled by the temperature sensed by the roll temperature sensors 44 located adjacent the furnace conveyor 34. Additionally, a slower heat "ramp up" is used. The heaters, e.g., the bottom heating coils 38, are controlled to provide a furnace inlet temperature of about 350° F. (177° C.) to about 500° F. (260° C.), preferably about 450° F. (232° C.), and a furnace outlet temperature of about 1100° F. (593° C.) to about 1250° F. (677° C.), preferably about 1200° F. (649° C.). However, due to this larger heating differential, the speed of the coated glass blank through the furnace is reduced to about 7.5 ft/min (2.3 m/min) to about 17.5 ft/min (5.3 m/min), preferably about feet per minute (3.0 meters/minute) with a total heating time of about 5.8 min to about 7.5 min. The target glass exit temperature is preferably about 1110° F. (599° C.) to about 1150° F. (621° C.), more preferably about 1125° F. (507° C.). The bottom coils 38 are controlled via the roll temperature sensors 44 to provide a roll temperature of about 400° F. (204° C.) to about 500° F. (260° C.) at the furnace inlet and a roll temperature of about 1100° F. (593° C.) to about 1300° F. (704° C.) at the furnace outlet.

With the above arrangement, the coated glass blank may be heated by radiation at the open spaces between the furnace rolls 36 and also by conduction through contact with the rolls 36. Sensing the temperature adjacent the furnace rolls 36 with the roll temperature sensors 44 reduces if not eliminates fluctuation in the temperature of the furnace rolls 36, which would in turn cause fluctuation of the temperature of the coated glass blank. In practice, the roll temperature sensors 44 and heating system are configured such that the roll temperature preferably is set about 100° F. (38° C.) higher than the desired furnace temperature at a given location in the furnace 32. While the non-coated glass blank can be heated and shaped to form the second ply 20 of the invention using a standard RPR process, the coated glass blank forming the first ply 12 is preferably prepared using the modified heating process described above. In the modified heating process, the bottom surface of the coated blank is heated as the coated blank moves through the furnace. The coated blank is preferably maintained in the furnace to provide a coated blank having similar temperatures at both the coated and uncoated surfaces by heating the uncoated bottom surface by radiation and the coated top surface by either forced or free convection. This modified heating process reduces tip curl of the coated blank which would be detrimental to the optical quality of the laminated product. Further, in the practice of the invention the RPR process is modified for the non-coated blank by sensing the temperature below the non-coated blank and adjacent the furnace conveyor supporting the non-coated blank and controlling both the top and bottom heaters.

At the end of the furnace 32, the softened glass blank, whether coated or non-coated, is moved from the furnace 32 to the shaping station 50 of the type disclosed in U.S. Pat. No. 5,286,271 and onto the lower mold 52. The lower mold 52 moves upwardly, lifting the glass blank to press the heat softened glass blank against the shaping surface 60 of the upper mold 58 to conform the glass blank to the shape, e.g., curvature, of the shaping surface 60. When shaping a coated substrate, release agents are preferably not applied to the shaping surface 60 or the lower mold 52. The upper surface of the glass blank is in contact with the shaping surface 60 of the upper mold 58 and is held in place by vacuum.

For the coated glass blank, in order do reduce scratching or physical damage to the coating, the coating can include an outer protective layer, such as but not limited to the protective coating described in U.S. patent application Ser. No. 09/058,440, which is herein incorporated by reference. However, other protective coatings could also be used, such as but not limited to oxides of silicon or titanium or other metal oxides or doped metal oxides. The shuttle arrangement 61 is actuated to move the upper vacuum mold 58 from the shaping station 50 to the transfer station 62, where the vacuum is discontinued to release the shaped glass blank onto the curved transfer rolls 64. The transfer rolls 64 move the shaped glass blank onto the rolls 72 and into the cooling station 70 for tempering or heat strengthening in any convenient manner.

In the practice of the invention, the shapes of the upper mold shaping surfaces 60, transfer rolls 64 and rolls 72 used for the coated blank and the non-coated blank may be different. For example, FIG. 4 shows an exemplary shaped glass blank (coated or uncoated) defining a glass ply 80 having a bottom 82, a top 84, a front edge 86 and a rear edge 88. A "vertical curvature" V is defined as the cross-sectional shape or curvature, e.g. radius, measured between the bottom 82 and the top 84. The "horizontal curvature" H is defined as the cross-sectional shape or curvature, e.g. radius, measured between the front edge 86 and the rear edge 88. In a presently preferred embodiment, the vertical curvature is preferably about 40 inches (1.0 m) to about 90 inches (2.3 m), more preferably about 50 inches (1.3 m) and the horizontal curvature is preferably about 600 inches (15.4 m) to about 7200 inches (182.9 m), more preferably between about 1200 inches (31 m) to 1800 inches (45.7 m). For shaping the uncoated blank into the second ply 20 for this preferred embodiment, the shaping surface 60, transfer rolls 64 and rolls 72 have contours conforming substantially to the desired final vertical and horizontal curvatures of the ply, e.g., about 50 inches (1.3 m) vertical radius and about 1200 inches (30 m) horizontal radius.

To form the coated glass blank into the first ply 12 having substantially the same curvature as the second ply 20, the shaping surface 60, transfer rolls 64 and rolls 72 used have reduced radii, i.e. greater curvature than that of the desired final shape. For example, to provide a coated first ply 12 having a vertical curvature of about 50 inches (1.3 m) and a horizontal curvature of about 1200 inches (30 m), the shaping surface 60, transfer rolls 64 and rolls 72 are configured so as to define a vertical curvature of about 49 inches (1.2 m) and a horizontal curvature of about 500 inches (13 m) to about 900 inches (23 m). This is because the coated blank, which is typically at a lower temperature than the uncoated blank, tends to "spring back" when deformed. Although it is preferred that the first and second plies 12 and 20 have substantially the same curvature, as shown in FIG. 2 and described above, the coated first ply 12 can be formed to have a slightly larger curvature such that if the first and second plies 12 and 20 are placed together, a distance D of preferably less than 0.5 mm is present between the centers of the plies 12 and 20. This difference in curvature can be achieved by using differently dimensioned shaping surfaces or differently radiused or shaped rollers, as described herein.

In the cooling station 70 air is directed from above and below the shaped glass blanks to temper or heat strengthen the glass blanks. The non-coated glass blank is preferably subjected to quenching pressure similar to the coated glass blank. The coated blank quenching pressures, e.g. 25 inches (63 cm) to about 35 inches (89 cm) of water column on top and inches (38 cm) to about 25 inches (63 cm) of water column from below, are recommended to help prevent the blanks from warping and to prevent temperature shock. The coated and non-coated glass blanks are preferably maintained in the quenching station until the glass blanks are set e.g. dimensionally stable.

As can be appreciated when conveying or moving the bent and shaped blanks, the surfaces of the blank should be protected against scratches. One technique is to contact the blank surfaces, coated and uncoated, with knitted kevlar. For example, kevlar sleeves can be placed on the pegs of a peg conveyor at an inspection station.

To form the laminated sidelite 10 of the invention, the coated glass ply 12 is positioned with the coated inner major surface 14 facing a substantially complimentary inner major surface 22 of the non-coated ply 20 and separated therefrom by the interlayer 18 as shown in FIG. 2. A portion, e.g. a band of about 2 mm in width, of the coating 16 can be removed from around the perimeter of the first ply 12 before lamination as described below. Since the non-coated ply 20 has the same or a larger radius of curvature than the coated ply 12, the non-coated ply 20 is not as deep and, therefore, the middle portions of the coated ply 12 and non-coated ply 20 may be spaced a greater distance than at the end portions, as shown in FIG. 2. As discussed above, a ceramic band 90 can be provided on one or both of the plies 12 or 20, e.g., on the outer surface 13 of the first ply 12, to hide the non-coated peripheral edge region of the laminated sidelite and/or to provide addition shading to passengers inside the vehicle.

The polyvinyl butyral interlayer 18 having a thickness of about 0.70 mm is positioned between the first and second plies 12 and 20 as shown in FIG. 2, with the functional coating 16 facing the interlayer 18. The first ply 12, interlayer 18 and second ply 20 are laminated together in any convenient manner, for example but not to be considered as limiting as disclosed in U.S. Pat. Nos. 3,281,296; 3,769,133; and 5,250,146, herein incorporated by reference, to form the laminated sidelite 10 of the invention. An edge sealant 26 can then be applied to the edge of the sidelite 10, as shown in FIG. 1.

Although the preferred method of forming the laminated sidelite 10 of the invention utilizes a modified version of the apparatus and method disclosed in U.S. Pat. No. 5,286,271, the sidelite 10 of the instant invention may be formed with other methods, such as horizontal press bending methods disclosed, for example, in U.S. Pat. Nos. 4,661,139; 4,197,108; 4,272,274; 4,265,650; 4,508,556; 4,830,650; 3,459,526; 3,476,540; 3,527,589; and 4,579,577, the disclosures of which are herein incorporated by reference.

The present invention provides a two-glass ply laminated sidelite having improved performance over known laminated sidelites. More particularly, the sidelite of the invention has a functional coating, such as a solar control coating, applied directly onto one of the glass plies. The coating is preferably located on the interior of the laminated sidelite between the two glass plies and is relatively well protected from the effects of mechanical and environmental damage. Additionally, since the total thickness of the laminated sidelite is substantially equivalent to the conventional window channel thickness of most commercial vehicles, the laminated sidelite of the invention can not only be incorporated into new vehicle models but can also be retrofitted into existing vehicles.

It will be readily appreciated by those skilled in the art that modifications may be made to the invention without departing from the concepts disclosed in the foregoing description. For example, the particular vertical and horizontal curvatures discussed above are for the presently preferred embodiment of the invention and should not be considered as limiting. As will be appreciated by one skilled in the art, the specific shapes and curvatures of the glass plies depend upon the make of vehicle or intended use of the laminated article. Further, although curved plies are preferred, the method and apparatus of the invention could be used to make substantially planar articles. Additionally, although in the preferred embodiment only one ply includes a functional coating, it is to be understood that the invention could also be practiced with both plies having a functional coating or one ply having a functional coating and the other ply having a non-functional coating, e.g., a photocatalytic coating. Moreover, as will be appreciated by one of ordinary skill in the art, the preferred operating parameters described above can be adjusted, if required, for different substrate materials and/or thicknesses. Accordingly, the particular embodiments described in detail herein are illustrative only and are not limiting to the scope of the invention, which is to be give the full breadth of the appended claims and any and all equivalents thereof.

What is claimed is:

1. A laminated sidelite, comprising:

a first heat treated glass ply having a concave surface with a predetermined concave shape and a first set of dimensions, the first glass ply having a thickness ranging from 1.6 mm to 2.1 mm;

a functional coating selected from MSVD coatings, CVD coatings, spray pyrolysis coatings and sol gel coatings and located on at least a portion of the first glass ply concave surface, the functional coating being a solar control coating having at least one dielectric layer and at least one infrared reflective layer;

a second heat treated glass ply having a convex surface with a predetermined convex shape and a second set of dimensions generally corresponding to the first set of dimensions and having a thickness ranging from 1.6 mm to 2.1 mm; and a polyvinyl butyral interlayer located between the first and second glass plies, the interlayer having a thickness of 0.50 mm to 0.80 mm, with the functional coating facing the interlayer, and with the laminated sidelite having a total thickness ranging from 4.0 mm to 5.0 mm.

2. The article as claimed in claim 1, wherein the first and second heat treated glass plies are selected from heat strengthened glass and tempered glass.

3. The article as claimed in claim 1, wherein the functional coating is selected from electroconductive coatings, heatable coatings and antenna coatings.

4. The article as claimed in claim 1, wherein the functional coating is a low emissivity coating.

5. The article as claimed in claim 1, wherein at least a portion of the first ply concave surface is not coated by the functional coating, and at least one of the first and second plies has a colored, opaque or translucent band provided over one or more surfaces to hide the uncoated portion of the first ply.

* * * * *